(12) United States Patent  
Hanna et al.

(10) Patent No.: US 8,448,581 B2  
(45) Date of Patent: May 28, 2013

(54) TABLE APPARATUS FOR A VEHICLE SEAT (75) Inventors: Jason Kyle Hanna, Kilkeel (GB); Philip Gordon, Downpatrick (GB); James Thompson, Kilkeel (GB)

(73) Assignee: J Thompson Solutions Ltd, Kilkeel (GB)

( * ) Notice: Subject to any disclaimer, the term of this patent is extended or adjusted under 35 U.S.C. 154(b) by 481 days.

(21) Appl. No.: 12/601,586

(22) PCT Filed: May 23, 2008

(86) PCT No.: PCT/EP2008/004116  
§ 371 (c)(1),  
(2), (4) Date: Jun. 1, 2010

(87) PCT Pub. No.: WO2008/141829  
PCT Pub. Date: Nov. 27, 2008

(65) Prior Publication Data  
US 2010/0319588 A1    Dec. 23, 2010

(30) Foreign Application Priority Data  
May 24, 2007 (GB) .................................. 0709973.2

(51) Int. Cl.  
*A47B 3/00* (2006.01)

(52) U.S. Cl.  
USPC ........................................... 108/44; 108/137

(58) Field of Classification Search  
USPC ........ 248/277.1, 281.11, 292.12; 297/188.17, 297/145, 149, 188.21; 296/24.34, 37.8, 37.15, 296/37.16; 108/44, 93–96, 102, 103, 137–141, 108/145, 20  
See application file for complete search history.

(56) References Cited

U.S. PATENT DOCUMENTS 1,914,729 A * 6/1933 Roos .............................. 312/328  
3,717,375 A * 2/1973 Slobodan ....................... 297/162  
(Continued)

FOREIGN PATENT DOCUMENTS

DE    4343242 A1    6/1995  
DE    19901072 C1   3/2000  
DE    20020072 U1   4/2002

OTHER PUBLICATIONS

International Search Report for PCT/EP2008/004116, mailed Aug. 28, 2008.

*Primary Examiner* — Janet M Wilkens  
(74) *Attorney, Agent, or Firm* — Withrow & Terranova, P.L.L.C.

(57) ABSTRACT

A table apparatus for a vehicle seat comprising a table, having at least one table leaf, and a table support mechanism, wherein the table support mechanism enables translational movement of the table between a substantially horizontal stowed configuration and a deployed configuration. In a preferred embodiment, the linkage arrangement of the table support mechanism comprises at least one substantially horizontally extending support arm extending from a table support member, the table being mounted upon a distal end of the support arm, the support arm being pivotally connected to the table support member for rotation about a first pivot axis in a substantially horizontal plane about the support member, the table being pivotally connected to said distal end of the support arm for rotation about a second pivot axis in a substantially horizontal plane, linkage means being provided for normally constraining rotational movement of the table about the second pivot axis to follow rotational movement of the support arm about the first pivot axis such that the rearmost table face remains substantially aligned to the user such that the table orientation is maintained substantially parallel to its final deployed position during movement between said stowed and deployed configurations.

24 Claims, 8 Drawing Sheets

U.S. PATENT DOCUMENTS

| | | | | |
|---|---|---|---|---|
| 4,944,552 A | * | 7/1990 | Harris | 297/145 |
| 5,547,247 A | * | 8/1996 | Dixon | 297/145 |
| 5,549,052 A | * | 8/1996 | Hoffman | 108/139 |
| 5,651,576 A | * | 7/1997 | Wallace | 296/65.11 |
| 5,683,136 A | * | 11/1997 | Baumann et al. | 297/162 |
| 5,696,574 A | * | 12/1997 | Schwaegerle | 351/245 |
| 5,701,826 A | * | 12/1997 | Dodgen | 108/44 |
| 6,142,559 A | * | 11/2000 | Sorel et al. | 297/135 |
| 6,386,413 B1 | * | 5/2002 | Twyford | 224/553 |
| 6,793,281 B2 | * | 9/2004 | Duerr et al. | 297/147 |
| 7,506,923 B1 | * | 3/2009 | Gauss | 297/150 |
| 2005/0012375 A1 | | 1/2005 | Giasson | |
| 2006/0156962 A1 | * | 7/2006 | Holt | 108/50.11 |

* cited by examiner

TABLE APPARATUS FOR A VEHICLE SEAT

This application is a 35 USC 371 National Phase filing of PCT/EP2008/004116 filed May 24, 2007, which claims the benefit of United Kingdom patent application 0709973.2, filed May 24, 2007, the disclosures of which are incorporated herein by reference in their entireties.

FIELD OF THE INVENTION

The present invention relates to a stowable table apparatus for a seat, and in particular to an in-seat table apparatus for vehicles and most particularly for aircraft.

BACKGROUND TO INVENTION

Conventional in-seat tables consist of bi-fold or single leaf tables, which are stored in an upright position, typically within a console or armrest to one side of the seat, and, in use, are translated and or rotated onto the required plane. Positioning relative to the passenger is achieved through the use of parallel slides and hinges.

However, the multiplicity of translational and rotational movements required for table deployment and stowage tend to overcomplicate and reduce the intuitiveness of such assemblies. It is considered therefore that increased intuitiveness embodied within the design will aid passenger comfort. The use of parallel slides for transactional movements may mean that the user has to support the table in two locations in order to ensure smooth movement.

Another problem with such designs is that the contained rigid mechanisms cause the table to interfere with passenger access and egress whilst the table is in the deployed state and the upright storage position can cause storage problems where space within the console is limited, or example due to installations within the console, or the need for access beneath the console, for example for the legs of a passenger in a seat behind.

SUMMARY OF THE INVENTION

According to the present invention there is provided a table apparatus for a vehicle seat comprising a table, having at least one table leaf, and a table support mechanism, wherein the table support mechanism enables translational movement of the table between a substantially horizontal stowed configuration and a deployed configuration.

Preferably the table support mechanism comprises a table support member and a linkage arrangement adapted to guide the translational movement of the table through an arc between said stowed configuration and at least a partly deployed configuration. More preferably the linkage arrangement of the table support mechanism is adapted to maintain the rearmost table face substantially aligned to the user such that the table orientation is maintained substantially parallel to its final deployed position during movement between said stowed and deployed configurations.

In a preferred embodiment, the linkage arrangement of the table support mechanism comprises at least one substantially horizontally extending support arm extending from the table support member, the table being mounted upon a distal end of the support arm, the support arm being pivotally connected to the table support member for rotation about a first pivot axis in a substantially horizontal plane, the table being pivotally connected to said distal end of the support arm for rotation about a second pivot axis in a substantially horizontal plane, linkage means being provided for normally constraining rotational movement of the table about the second pivot axis to follow rotational movement of the support arm about the first pivot axis such that a rearmost table face remains substantially aligned to the user such that the table orientation is maintained substantially parallel to its final deployed position during movement between said stowed and deployed configurations. Preferably the linkage means is arranged to permit at least limited independent rotation of the table with respect to the support arm about said second pivot axis at least when the table is in a partially deployed configuration to permit the table to be rotated to an out of use position to facilitate access to the seat.

In one embodiment, said linkage means comprises a guide link pivotally connected at one end to said support member at a location spaced from said first pivot axis and at an opposite end to said table at a location spaced from said second pivot axis, to extend substantially parallel to the support arm, whereby said support arm and guide arm are arranged in a parallelogram relationship for guiding movement of the table relative to the support member. Preferably said guide arm is arranged such that said first and second pivot axes are aligned with the pivot axes of the guide arm, connecting the guide arm to the support member and table respectively, when the table is in said partially deployed configuration to permit said independent rotation of said table.

In a alternative embodiment, the linkage means comprises a plurality of intermeshing gears rotatably mounted on said support arm comprising a first gear, said first gear being non-rotatably connected to said support member and centred about said first axis, a second gear, said second gear being non-rotatably connected to said table and centred about said second axis, and an odd number of intermediate gears extending between said first and second gear along the intervening length of the support arm, said intermediate gears constraining rotation of the second gear to follow rotation of the first gear. Preferably said second gear is mounted on said table to permit limited rotation of said second gear with respect to said table against a biasing force to permit limited independent rotation of the table away from the user about said second axis.

In a further alternative embodiment, the linkage means comprises a first pulley or sprocket rotatably mounted on one end of said support arm, centred about said first axis and non-rotatably connected to said support member, a second pulley or sprocket rotatably mounted on an opposite end of the support arm, centred about said second axis and non-rotatably connected to said table, and an endless belt or chain extending between said first and second pulleys constraining rotation of the second pulley or sprocket to follow rotation of the first pulley or sprocket. Preferably a tensioning means is provided for tensioning the belt or chain on one side of the support arm, said tensioning means including biasing means to take up any slack in the belt or chain on said side of the support arm, said tensioning means permitting limited rotation of said second pulley or sprocket with respect to the first pulley or sprocket against the biasing force of the biasing means to permit limited independent rotation of the table away from the user about said second axis. Alternatively at least a portion of the belt, arranged to be located on one side of the support arm, may comprise or incorporate a resilient section enabling elongation of said resilient section against a biasing return force, said resilient section being capable of elongation to permit limited rotation of said second pulley or sprocket with respect to the first pulley or sprocket against said biasing return force to permit limited independent rotation of the table away from the user about said second axis.

Preferably the table is arranged to be enclosed within a console to one side of the seat when it its stowed configuration. A latch means may be provided for retaining said table in said stowed configuration. A release mechanism, such as a manually operable button or switch, may be provided for selectively releasing said latch means to release the table from its stowed configuration. Preferably biasing means is provided for urging the table from its stowed configuration towards its deployed configuration upon actuation of the release mechanism.

Preferably the table support mechanism is arranged such that, when in its deployed configuration, the table is located at a raised position with respect to its stowed configuration. The table support member may be slidably mounted on a guide means for guiding movement of the table support member, and the table mounted thereon, between a first position at a first height and a second position at a second height, said second height being greater than said first height, during a transverse translational movement of the table support member with respect to the guide means.

In a preferred embodiment, the guide means comprises a pair of parallel guide blocks, said support member being slidably mounted between said parallel guide blocks, each guide block having at least one elongate guide channel or groove on a side face thereof facing said support member, said support member being provided with projecting follower members projecting from opposing first and second side walls of the support member to be received with respective guide channels of the guide blocks for guiding movement of the support member with respect to the guide blocks between a retracted lower position and an extended raised position.

Preferably each guide block is provided with first and second spaced guide channels, opposing sides of the support member being provided with corresponding first and second outwardly projecting follower members to be respectively receivable with said first and second guide channels.

In one embodiment, the support member extends from the guide blocks in cantilever fashion towards its extended raised position such that weight of the table exerts a moment about the first and second follower members, the first and second guide channels being configured such that, when the support member is in its extended raised position, the weight of the table exerts a moment about the first follower members to bias the second follower members towards an uppermost end of the respective second ends of the second guide channels, whereby the first follower members are biased towards an uppermost end region of the respective first channels, said uppermost end region of the respective first channels extending substantially horizontally such that the weight of the table acts to retain the support member in its extended raised position.

Preferably the guide channels of the guide means are configured such that, when the support member is in its retracted lower position, the relative positions of the respective guide channels of the guide blocks are arranged such that the table is arranged substantially horizontally, and, when the support member in its extended raised position, the relative positions of the respective guide channels of the guide blocks are arranged are arranged in a non-parallel manner such that the table is inclined with respect to the horizontal. Where the table is to be used with a seat for an aircraft, when the support member is in its raised extended position, the table is preferably inclined forwardly at an angle of approximately 3° to the horizontal to compensate for the pitch of the aircraft during normal flight.

Preferably the support member is biased towards its extended raised position by biasing means. In one embodiment, the biasing means comprises a overcentre mechanism such that, when the support member is in its retracted lower position, the biasing means acts in a direction to maintain the support member in said retracted lower position, and, as the support member is moved towards its extended raised position, the biasing means acts in a direction to urge the support member towards its extended raised position.

Accordingly, the invention provides an in-seat table apparatus comprising one or more table leafs that can be are stored in a horizontally related plane and may be secured in the stowed configuration using a suitable latch mechanism. The table can be moved to a fully deployed position by either pulling to the side or to the front of its stored location. Smooth operation is achieved by a using mechanism or plurality of mechanisms, such as two parallel links, gears or a chain/belt driven mechanism, that ensures the table travels upon a predetermined parallel path during deployment/stowing. The relationship between pivot positions and mechanism may be optimised depending on the users requirements primarily to ensure optimum table coverage over a specified distance. This design allows for simpler intuitive kinematics and in some cases a reduction in the number of components required. Over the specified usable distance, the table may be maintained parallel to the user. However, when the table is at least partially deployed, passenger egress and access can be improved by enabling the table to be pivoted independently, away from the seated position.

In one embodiment, the apparatus includes an actuation means which raises the intuitiveness by 'presenting the table' to the passenger. This initial presentation may perhaps be to a predetermined distance and occur at a controlled speed if required.

In one embodiment there is provided a mechanism for raising or lowering the table to a predetermined height with the ability to 'lock' the table in position by utilising the weight of the assembled components. Dependant upon the size or weight of the table, or indeed end user needs, the operation may be assisted by an actuation means. Therefore raising and lowering the table can be one-handed operations whereby the table can easily be pulled along a predetermined path to its final resting position. The table can only be released from this position by raising the edge that is furthest from the point of rotation until the table is in essence weightless. Again the table returns along a predetermined, definable path. Separately this mechanism may also incorporate a resilient return device which will aid deployment.

In one embodiment, the table can start at one plane for example parallel to the floor and finish at a different angle if required. The definable path becomes 3 dimensional in that the path followed may move along the X, Y and Z-axis whilst finishing at a planar angle that is different to the initial.

DESCRIPTION OF THE DRAWINGS

Embodiments of the invention will now be described, by way of example, with reference to the accompanying drawings, in which.

DETAILED DESCRIPTION

Figure 1:
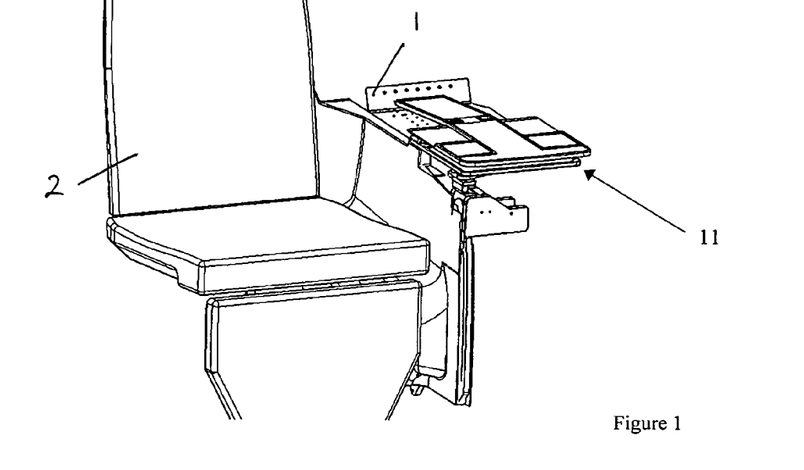
FIG. 1 is a perspective view of a seat embodying the invention.

FIG. 1 shows a perspective view of a table 11 embodied within a suitable cosmetic shroud, typically comprising a console 1 located alongside a seat 2, typically a business class airline seat. Supporting structures have been removed for clarity of view. In the position shown in FIG. 1, the table 11 is stowed horizontally, parallel to and beneath a horizontal upper surface of the console 1 within an upper region of the console 1.

Figure 2:
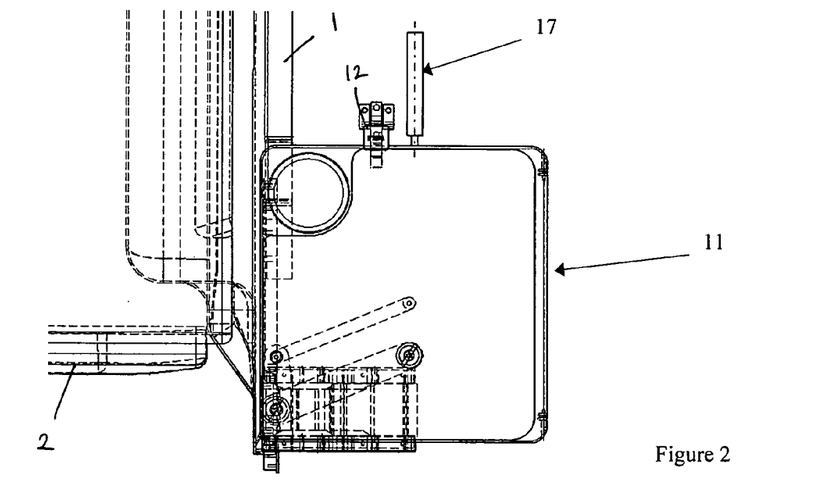
FIG. 2 is a schematic top view of the invention with the table stowed.

As illustrated in FIG. 2, whilst in the stowed position, the table 11 can be secured, if required, by a suitable latch mechanism 12. The table 11 is connected to the console/seat assembly by linkage means providing guided movement of the table 11 between stowed and operative positions, as will be described below. In the stowed position the deployment actuation means 17, comprising a biasing means biasing the table towards an extended or operative deployed position, is compressed between its fixed mount and the rear table face, the table 11 being maintained in the stowed position by the latch mechanism 12. A release mechanism 22 is provided, comprising a button or switch, for releasing the latch mechanism 12 to deploy the table from its stowed position.

Figure 3:
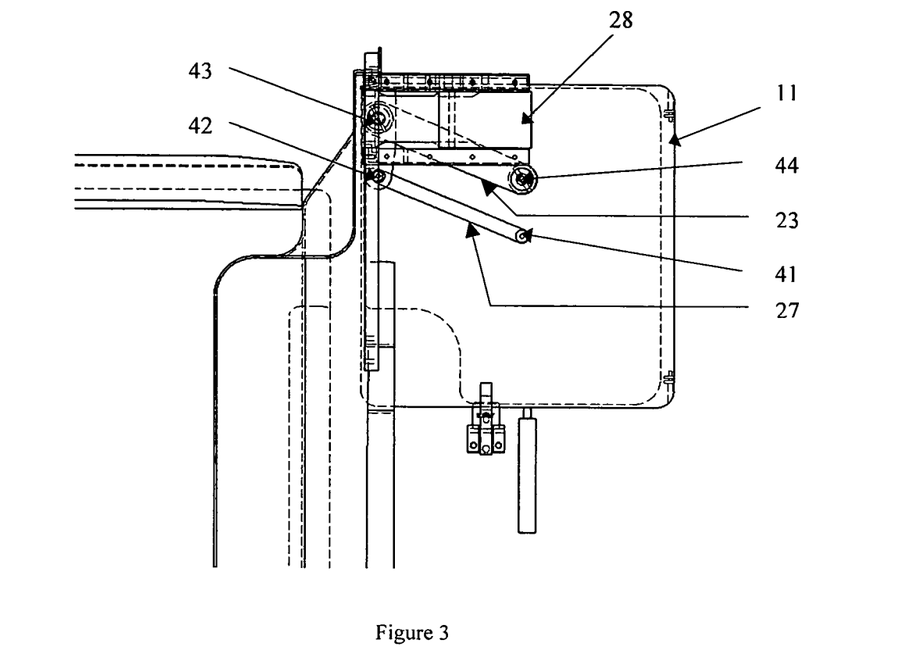
FIG. 3 is a schematic bottom view of the invention with the table stowed

As shown in FIG. 3, the linkage means comprise a load-carrying link 23 for supporting the table, pivotally connected between the table 11, under the table surface, and a table carrying arm 28. A guide link 27 is also pivotally mounted between the table carrying arm 28 and table 11 to extend parallel to the load-carrying link 23. The relationship between the links 23, 27 and their associated pivot points 41, 42, 43, 44 provides a parallelogram mechanism that controls the travel path and useable section of table travel. It is this mechanism that maintains the rearmost table face 11 aligned at the required angle to the user (whilst deploying, in-use and stowed). In the example given the table could be considered parallel to the user.

Figure 11:
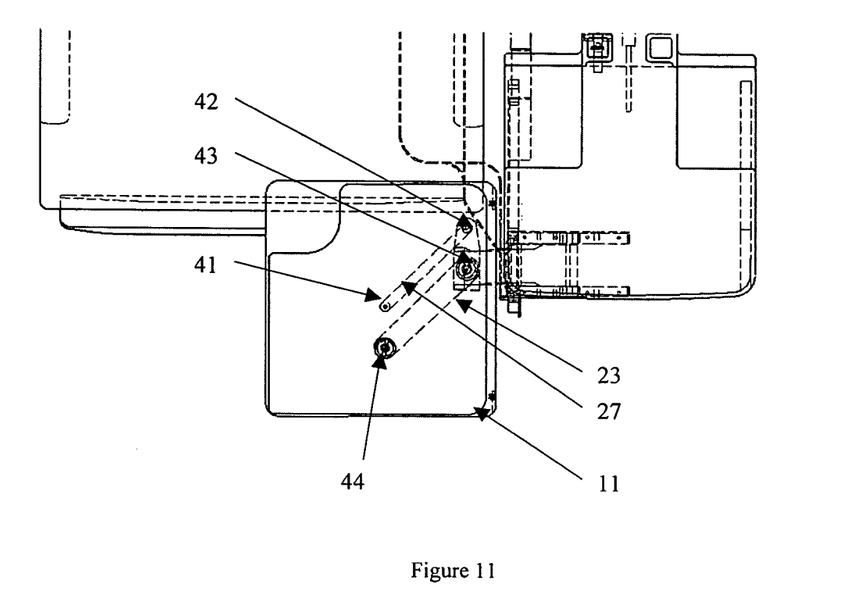
FIG. 11 is a schematic top view of the table in a position suitable for someone of larger build.

The design of the mechanism is such that the table can deployed to a range of positions distance allowing for people of different builds, for example. FIG. 11 depicts the table in use by someone of larger build. To reach this position, the passenger pulls the table 11 along a controlled arcuate path from the initially deployed state to the position shown in FIG. 5. During this motion, the links 23, 27 rotate in a controlled parallel state by rotating at their ends around the relative pivot points 41, 42, 43, 44.

Figure 12:
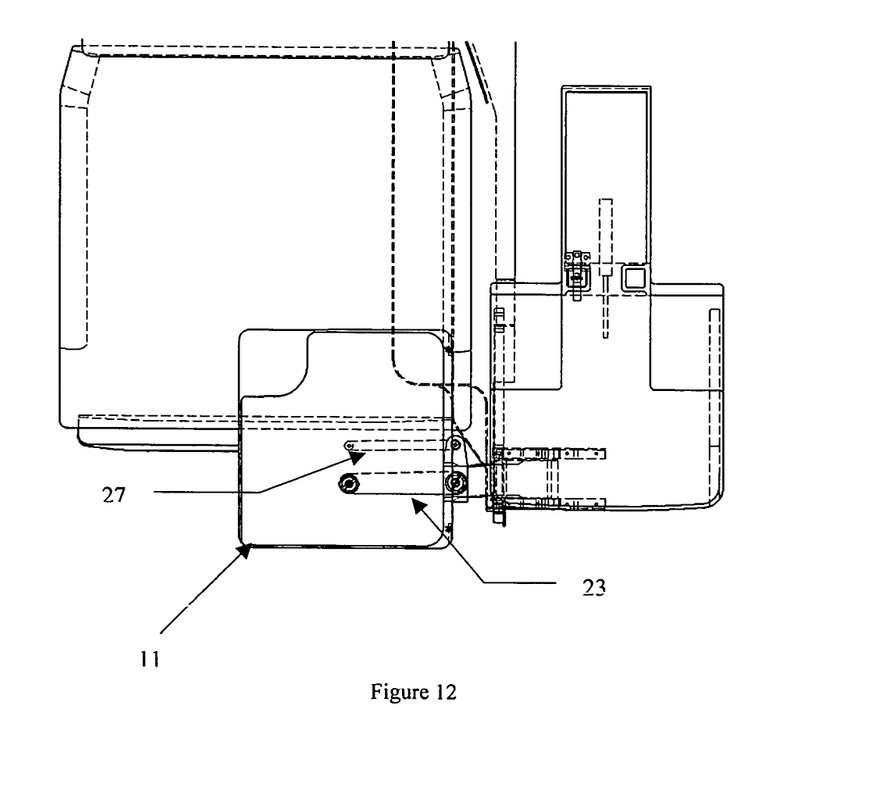
FIG. 12 is a schematic top view of the table in a position suitable for someone of medium build.

FIG. 12 depicts the table position for someone of medium build. This position is reached by pulling the table 11 towards the user. The parallel links 23, 27 rotate further, whilst controlling the angle between the user and the table edges.

Figure 5:
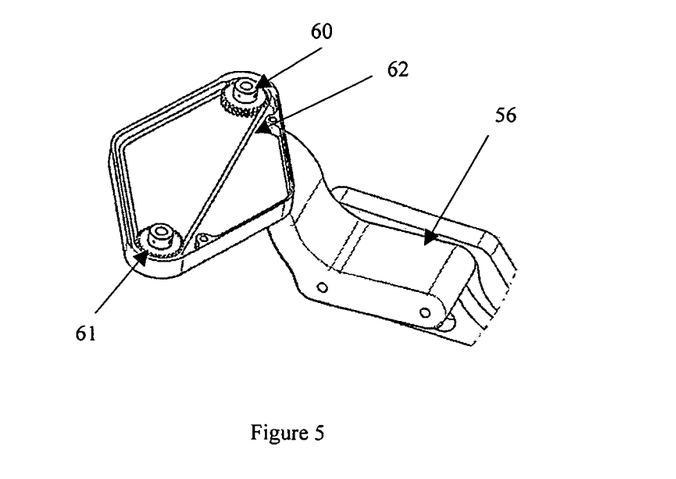
FIG. 5 is a schematic view of the mechanism incorporating a different mechanism type.
Figure 6:
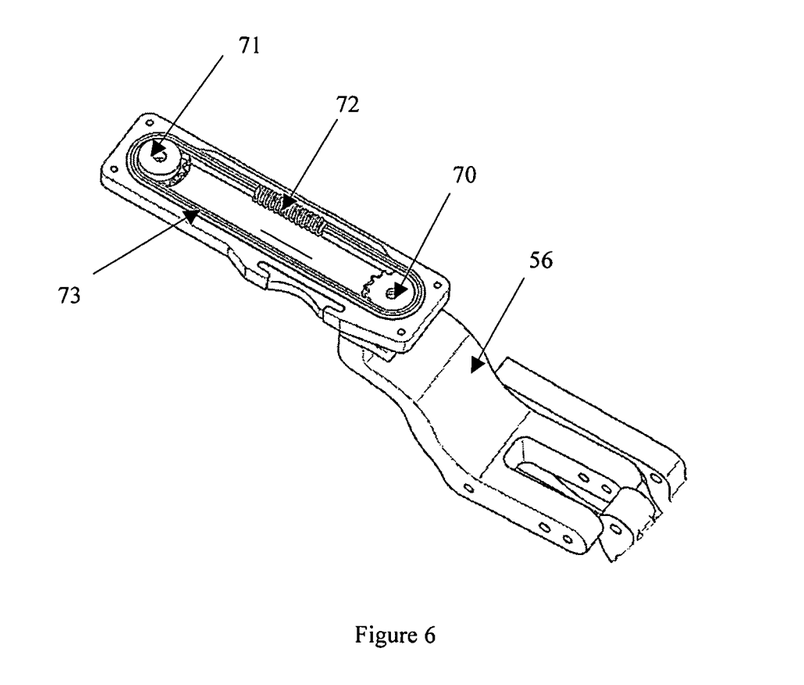
FIG. 6 is a schematic view of the mechanism incorporating a different mechanism type.
Figure 7:
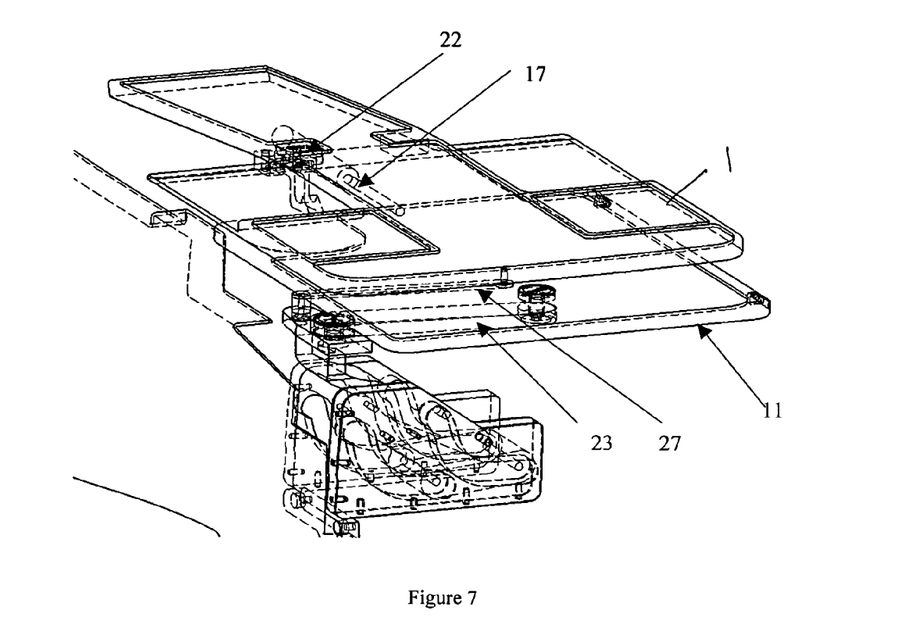
FIG. 7 is a perspective view of the invention with the table in the initially presented state.
Figure 13:
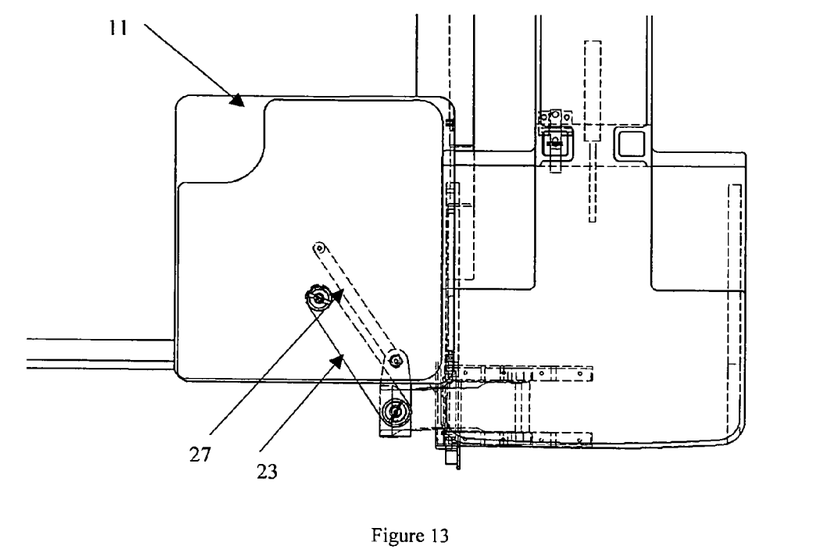
FIG. 13 is a schematic top view of the table in a position suitable for someone of small build.

FIG. 13 depicts the table position for someone of slight build. This position is reached by pulling the table 11 towards the user. The parallel links 23, 27 rotate further, whilst controlling the angle between the user and the table edges. As shown in FIGS. 5, 6 and 7—the mechanism allows a controlled, predetermined useable table range of movement to be defined through specification.

Figure 14:
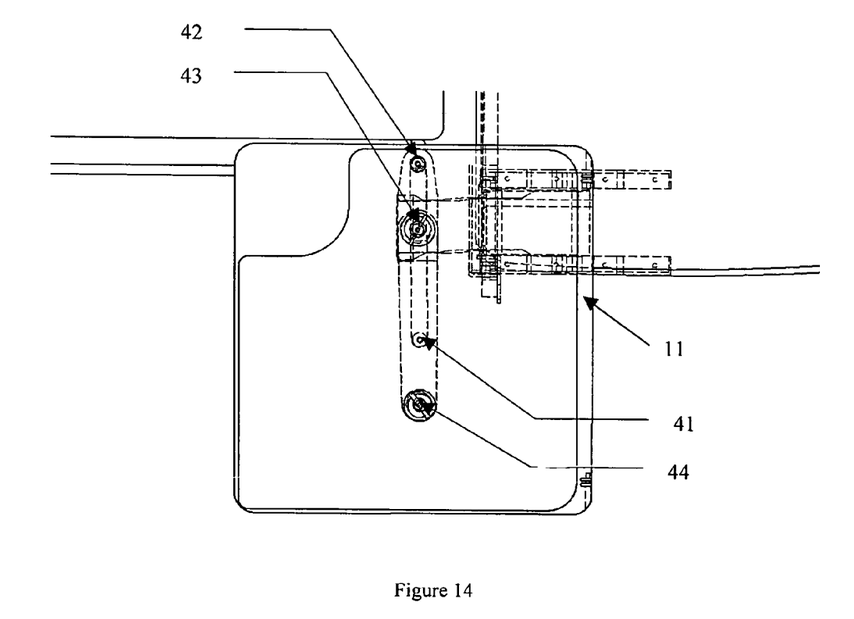
FIG. 14 is a schematic top view of the table in the over centre position allowing egress/access to the passenger place.

In order to ease access and egress for the passenger, it is desirable for the table to be rotated away from the passenger. In this embodiment, the rotation is only achievable at a specific, controlled location that is determined by the relationship between the table 11 and link pivots 41, 42, 43, 44. In order to use this functionality the table must be in a position where the link pivot points 41, 42, 43, 44 are aligned along a single plane that runs parallel to and through the pivot 41, 42, 43, 44 axes as shown in FIG. 14.

Figure 15:
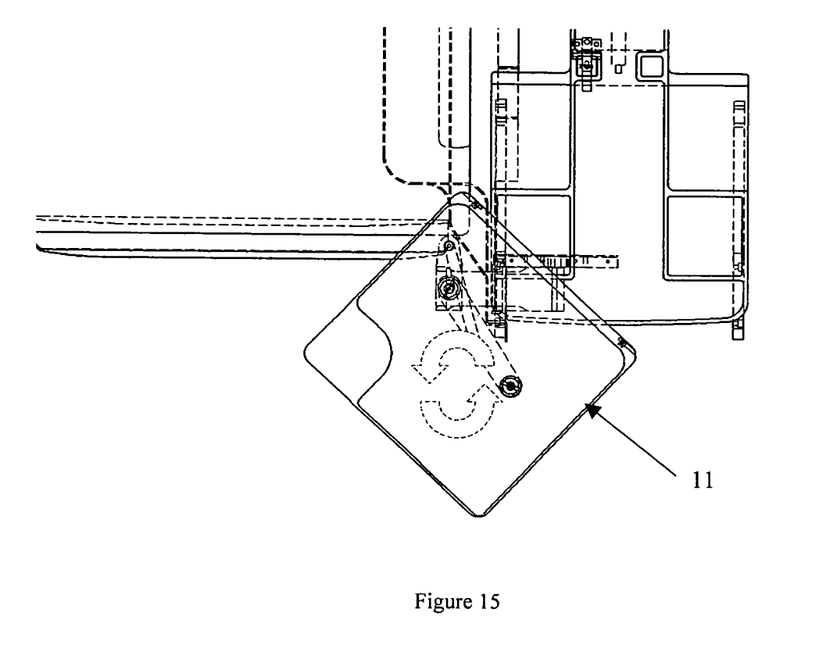
FIG. 15 is a schematic top view of the table in the 'rotated' position increasing egress.

When this position is reached, the table 11 may pivot independently and thus rotate away from the user creating an open space as shown in FIG. 15. This space can then be utilised for access and egress.

Figure 4:
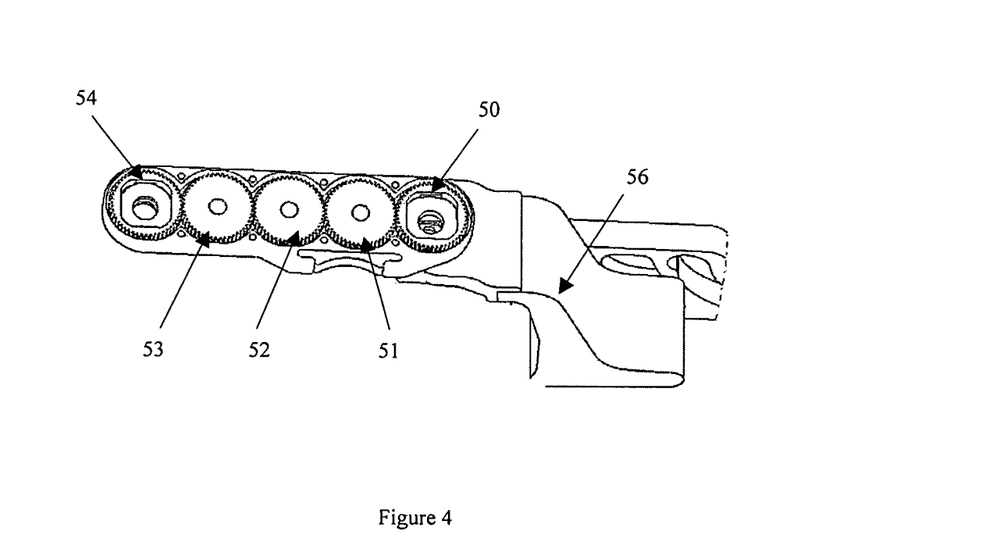
FIG. 4 is a schematic view of the invention incorporating a different mechanism type.

As shown in FIG. 4, in an alternative embodiment, the plurality of parallel links can be replaced by a system of interacting gears 50-54. A first gear 50 is rigidly fixed to a table carrying arm 56. Gears 51-53 are free to rotate around respective axes through their centres. A further gear 54 is rigidly fixed to the table 11 except in the case where the design requirement specifies that the user must be able to pivot the table away from them in order to improve egress. In this case the design can incorporate a resilient return device or mechanical interaction which replaces said rigid joint between table 11 and gear 54. Supporting structures have been removed for clarity of view.

FIG. 5 shows a further embodiment, wherein the plurality of links are replaced by a belt system 63, which may be toothed or otherwise. A first pulley 60 is rigidly fixed to the seat structure, such as the table carrier arm 56. A second pulley 61 is rigidly fixed to the table 11, except in the case where the design requirement specifies that the user must be able to pivot the table away from them in order to improve egress. In this case the design can incorporate a resilient return device or mechanical lock, the latter replacing said rigid joint between table 11 and second pulley 61. The resilient return device may be used to pretension the belt 63 and overriding the device will allow the table 11 to be pivoted away from the passenger space about the axis of the second pullet 61. Supporting structures and tensioning device have been removed for clarity of view.

FIG. 6 shows a further embodiment, wherein the plurality of links are replaced with a chain and sprocket system. A first toothed sprocket 70 is rigidly fixed to the seat structure or pivot arm 56. A roller chain 73 meshes with and extends between the first toothed sprocket 70 and a second toothed sprocket 71 which is rigidly fixed to the table 11 to maintain the 'parallel' relationship between the table 11 and the front of the seat 2.

In this embodiment, the design can incorporate a resilient return device or mechanical lock, the latter replacing said rigid joint between table 11 and the second toothed sprocket 71. The resilient return device 72 may be used to pretension the chain 73 and overriding the device will allow the table 11 to be pivoted away from the passenger space. Alternatively the resilient return device may be joined directly to the chain—effectively acting as a resilient chain link. Supporting structures have been removed for clarity of view.

In each case, the linkage means provides a controlled movement of the table 11 in a substantially horizontal plane between a stowed position and an extended operative position in a substantially circular motion with the table being maintained in parallel relationship to the front edge of the seat 2.

In use, the table 11 is released by activating the release mechanism such as but not solely limited to a button or lever 22 (see FIG. 7). After the table has been released, it travels to an initial presentation point shown in FIG. 7 under the action of the actuation means 17. The load and travel of the actuation means 17 controls the distance and speed of deployment over this initial section. The table 11 travels along a path that is controlled by the linkage means, such as parallel links 23, 27, resulting in the table following a defined path.

Figure 10:
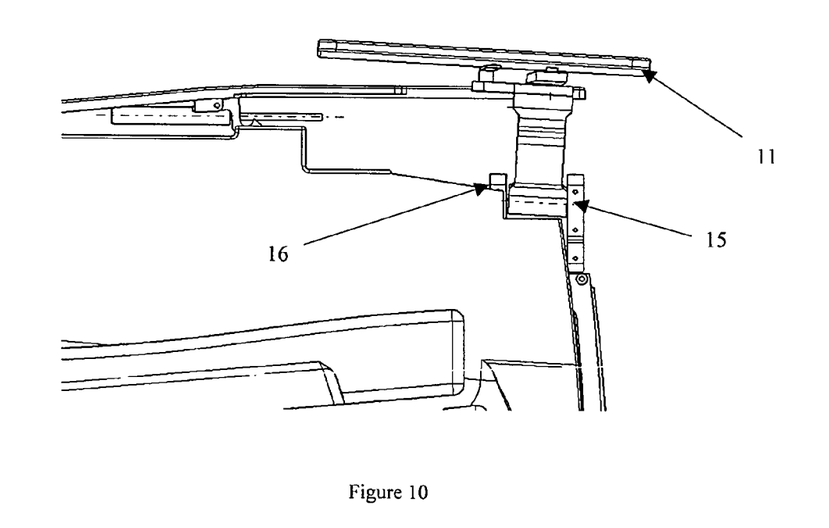
FIG. 10 is a schematic side view of the table fully raised, tilted and fully deployed.

The linkage mechanism is also adapted to enable the table to be raised from a lowered position at a first height, wherein the table is receivable within the console 1 in its stowed position, and a raised position at a second height, above the first height, wherein the table is at a convenient height for use by a passenger seated in the seat 2. In order to achieve this movement, the table carrying arm 28,56 upon which the table is supported is located between a pair of parallel guide blocks 15,16, each guide block 15,16 having spaced guide channels 30,32 within which are received respective follower members 34,36 extending from the sides of the table carrying arm 28,56, the guide channels 30,32 defining a guide path whereby the table carrying arm 28,56 moves in a vertical direction as the follower members 34,36 move along the guide channels 30,32. The guide channels 30,32 are arranged such that the table 11 is located parallel to the upper surface of the console 1 when it its lowered position and the table 11 is inclined forwardly to compensate for the normal flight pitch of the aircraft when in its raised position, as illustrated in FIG. 10. This is achieved by arranging the guide channels 30,32 of one guide block 15 being non-parallel to the guide channels of the other guide block 16 such that the table carrying arm 28,56 is effectively rotated as it moves along the guide channels 30,32.

Figure 8:
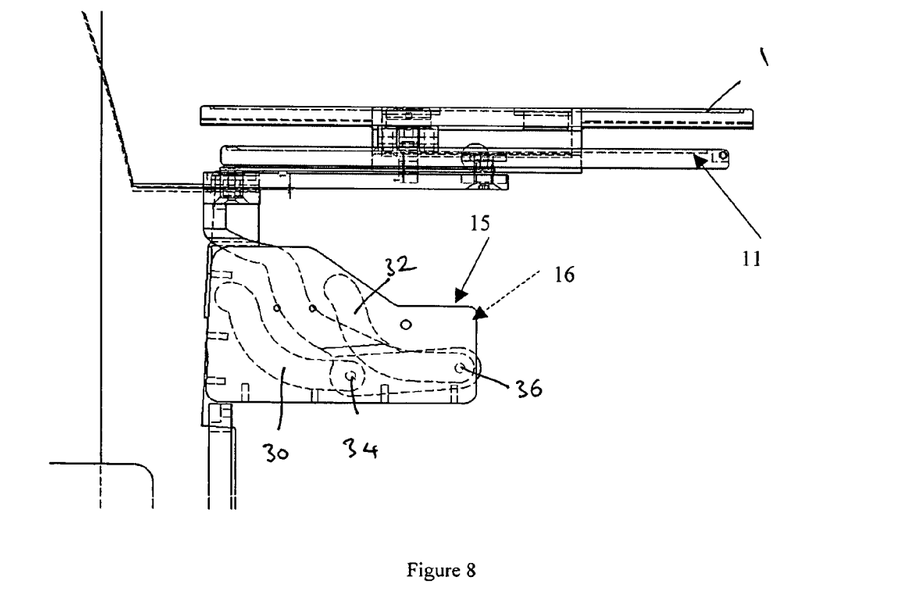
FIG. 8 is a schematic front view of the invention with the table in the lowest vertical position.

FIG. 8 shows a front view of the table 11 and the swarfing (a controlled path defined as a helix guided in 3 planes at an infinite number of locations) guide blocks 15,16. The angle between the table surface and perhaps the floor may be 0 degrees (as depicted) whilst in the stowed position. The angle required at the deployed position is a designed function of the swarfing channels 30,32 contained within said swarfing blocks 15, 16, whereby the angle of the table carrying arm 28,56 varies as the followers 34,36 of the arm 28,56 move along the guide channels.

Figure 9:
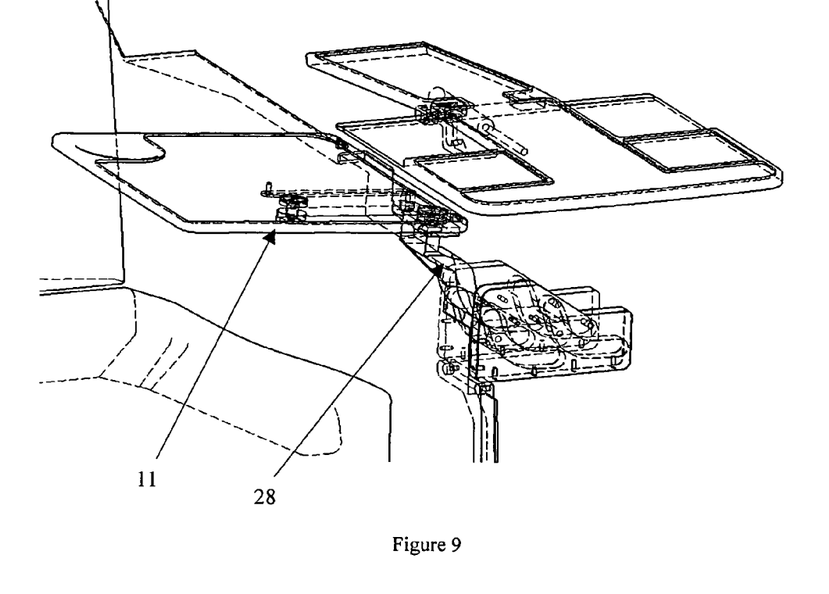
FIG. 9 is a perspective view of the table partially raised and fully deployed.

To increase the deployed height of the table, the user may raise the table 11 by pulling the table 11 along the path defined by the guide channels 30,32. FIG. 9 is a schematic perspective view of the table 11 partially raised, indicating the new position of the table carrier arms 28,56 within the channels 30,32. The shape of the channels 30,32 controls the rate of change in X, Y and Z along with the rate of angular change.

In the fully deployed state shown in FIG. 10 the table 11 is at its raised position and, depending upon specified requirements, may be tilted relative to the floor. The tilt is achieved by varying the 3 dimensional relationship between the channels 30,32 contained within the respective swarfing blocks 15, 16.

The uppermost end regions of the guide channels 30,32 are adapted such that the weight of the table 11 acting on the lever arm defined by the table carrying arm 28,56 and the linkage means extending laterally therefrom maintains the table 11 in its raised position until the table 11 is lifted to allow the follower members 34,36 to slide back down the guide channels 30,32. This is achieved by the arrangement shown in FIG. 8, whereby, in each guide block 15,16, a first guide channel 30 closest to the seat 2 has a horizontally extending end portion while a second guide channel 32 furthest from the seat 2 has an upwardly inclined end portion, such that the weight of the table 11 causes a moment to be applied about the table carrying arm 28,56 acting around the horizontally extending end portion of the first channels 30 to urge the followers 36 towards the upwardly inclined end portion of the second channels 32, in turn pushing the followers 34 into the horizontally arranged end portions of the first channels 30. To lower the table, a lifting action must be applied to the table 11, causing an opposite moment to be applied about the table carrying arm 28,56 acting around the horizontally extending end portions of the first channels 30 to urge the respective followers 36 away from the upwardly inclined end portions of the second channels 32 to in turn release the respective followers 34 from the horizontally extending end portions of the first guide channels 30.

A biasing means, such as a compression spring or gas strut (not shown) may act upon the table carrying arm 28,56 to urge the table carrying arm along the guide channels 30,32 towards its raised position. Preferably the biasing means is mounted at a position on the guide blocks 15,16 or an adjacent structure to provide an over centre action.

The invention is not limited to the embodiments described herein but can be amended or modified without departing from the scope of the present invention.

The invention claimed is:

1. A table apparatus for a vehicle seat comprising a table, having at least one table leaf, and a table support mechanism, wherein the table support mechanism enables translational movement of the table between a substantially horizontal stowed configuration to one side of the seat and a deployed configuration, wherein said table support mechanism comprises a table support member and a linkage arrangement adapted to guide the translational movement of the table through an arc between said stowed configuration and at least a partly deployed configuration, wherein the linkage arrangement of the table support mechanism is adapted to maintain a rearmost table face substantially aligned to a user such that the table orientation is maintained substantially parallel to its final deployed position during movement between said stowed and deployed configurations, where said linkage arrangement of the table support mechanism comprises at least one substantially horizontally extending support arm extending from the table support member, the table being mounted upon a distal end of the support arm, the support arm being pivotally connected to the table support member for rotation about a first pivot axis in a substantially horizontal plane, the table being pivotally connected to said distal end of the support arm for rotation about a second pivot axis in a substantially horizontal plane, linkage means being provided for normally constraining rotational movement of the table about the second pivot axis to follow rotational movement of the support arm about the first pivot axis such that the rearmost table face remains substantially aligned to the user such that the table orientation is maintained substantially parallel to its final deployed position during movement between said stowed and deployed configurations.

2. An apparatus as claimed in claim 1, wherein the linkage means is arranged to permit at least limited independent rotation of the table with respect to the support arm about said second pivot axis at least when the table is in a partially deployed configuration to permit the table to be rotated to an out of use position to facilitate access to the seat.

3. An apparatus as claimed in claim 1, wherein said linkage means comprises a guide arm pivotally connected at one end to said support member at a location spaced from said first pivot axis and at an opposite end to said table at a location spaced from said second pivot axis, to extend substantially parallel to the support arm, whereby said support arm and guide arm are arranged in a parallelogram relationship for guiding movement of the table relative to the support member.

4. An apparatus as claimed in claim 3, wherein the linkage means is arranged to permit at least limited independent rotation of the table with respect to the support arm about said second pivot axis at least when the table is in a partially deployed configuration to permit the table to be rotated to an out of use position to facilitate access to the seat, said guide arm being arranged such that said first and second pivot axes are aligned with the pivot axes of the guide arm, connecting the guide arm to the support member and table respectively, when the table is in said partially deployed configuration to permit said independent rotation of said table.

5. An apparatus as claimed in claim 1, wherein said linkage means comprises a plurality of intermeshing gears rotatably mounted on said support arm comprising a first gear, said first gear being non-rotatably connected to said support member and centred about said first axis, a second gear, said second gear being non-rotatably connected to said table and centred about said second axis, and an odd number of intermediate gears extending between said first and second gear along the intervening length of the support arm, said intermediate gears constraining rotation of the second gear to follow rotation of the first gear.

6. An apparatus as claimed in claim 5, and wherein said second gear is mounted on said table to permit limited rotation of said second gear with respect to said table against a biasing force to permit limited independent rotation of the table away from the user about said second axis.

7. An apparatus as claimed in claim 1, wherein said linkage means comprises a first pulley or sprocket rotatably mounted on one end of said support arm, centred about said first axis and non-rotatably connected to said support member, a second pulley or sprocket rotatably mounted on an opposite end of the support arm, centred about said second axis and non-rotatably connected to said table, and an endless belt or chain extending between said first and second pulleys constraining rotation of the second pulley or sprocket to follow rotation of the first pulley or sprocket.

8. An apparatus as claimed in claim 7, wherein a tensioning means is provided for tensioning the belt or chain on one side of the support arm, said tensioning means including biasing means to take up any slack in the belt or chain on said side of the support arm, said tensioning means permitting limited rotation of said second pulley or sprocket with respect to the first pulley or sprocket against the biasing force of the biasing means to permit limited independent rotation of the table away from the user about said second axis.

9. An apparatus as claimed in claim 7, wherein at least a portion of the belt, arranged to be located on one side of the support arm, comprises or incorporates a resilient section enabling elongation of said resilient section against a biasing return force, said resilient section being capable of elongation to permit limited rotation of said second pulley or sprocket with respect to the first pulley or sprocket against said biasing return force to permit limited independent rotation of the table away from the user about said second axis.

10. An apparatus as claimed in claim 1, wherein the table is arranged to be enclosed within a console to one side of the seat when it its stowed configuration.

11. An apparatus as claimed in claim 1, wherein latch means is provided for retaining said table in said stowed configuration.

12. An apparatus as claimed in claim 11, wherein a release mechanism is provided for selectively releasing said latch means to release the table from its stowed configuration.

13. An apparatus as claimed in claim 12, wherein biasing means is provided for urging the table from its stowed configuration towards its deployed configuration upon actuation of the release mechanism.

14. An apparatus as recited in claim 12, wherein the release mechanism is a manually operable button or switch.

15. An apparatus as recited in claim 12, wherein the release mechanism is a switch.

16. An apparatus as claimed in claim 1, wherein the table support mechanism is arranged such that, when in its deployed configuration, the table is located at a raised position with respect to its stowed configuration.

17. An apparatus as claimed in claim 1, wherein the table support member is slidably mounted on a guide means for guiding movement of the table support member, and the table mounted thereon, between a first position at a first height and a second position at a second height, said second height being greater than said first height, during a transverse translational movement of the table support member with respect to the guide means.

18. An apparatus as claimed in claim 17, wherein said guide means comprises a pair of parallel guide blocks, said support member being slidably mounted between said parallel guide blocks, each guide block having at least one elongate guide channel or groove on a side face thereof facing said support member, said support member being provided with projecting follower members projecting from opposing first and second side walls of the support member to be received with respective guide channels of the guide blocks for guiding movement of the support member with respect to the guide blocks between a retracted lower position and an extended raised position.

19. An apparatus as claimed in claim 18, wherein each guide block is provided with first and second spaced guide channels, opposing sides of the support member being provided with corresponding first and second outwardly projecting follower members to be respectively receivable with said first and second guide channels.

20. An apparatus as claimed in claim 19, wherein the support member extends from the guide blocks in cantilever fashion towards its extended raised position such that weight of the table exerts a moment about the first and second follower members, the first and second guide channels being configured such that, when the support member is in its extended raised position, the weight of the table exerts a moment about the first follower members to bias the second follower members towards an uppermost end of the respective second ends of the second guide channels, whereby the first follower members are biased towards an uppermost end region of the respective first channels, said uppermost end region of the respective first channels extending substantially horizontally such that the weight of the table acts to retain the support member in its extended raised position.

21. An apparatus as claimed in claim 18, wherein the guide channels of the guide means are configured such that, when the support member is in its retracted lower position, the relative positions of the respective guide channels of the guide blocks are arranged such that the table is arranged substantially horizontally, and, when the support member is in its extended raised position, the relative positions of the respective guide channels of the guide blocks are arranged in a non-parallel manner such that the table is inclined with respect to the horizontal.

22. An apparatus as claimed in claim 21, wherein, when the support member is in its raised extended position, the table is inclined forwardly at an angle of approximately 3° to the horizontal to compensate for the pitch of an aircraft during normal flight.

23. An apparatus as claimed in claim 18, wherein the support member is biased towards its extended raised position by biasing means.

24. An apparatus as claimed in claim 23, wherein the biasing means comprises a overcentre mechanism such that, when the support member is in its retracted lower position, the biasing means acts in a direction to maintain the support member in said retracted lower position, and, as the support member is moved towards its extended raised position, the biasing means acts in a direction to urge the support member towards its extended raised position.

* * * * *